US006590065B1

(12) United States Patent
Goldfinger

(10) Patent No.: US 6,590,065 B1
(45) Date of Patent: Jul. 8, 2003

(54) POLYTRIMETHYLENE ETHER ESTER AMIDE AND USE THEREOF

(75) Inventor: Marc B. Goldfinger, West Chester, PA (US)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/073,745

(22) Filed: Feb. 11, 2002

Related U.S. Application Data

(63) Continuation-in-part of application No. 10/013,073, filed on Dec. 10, 2001, now abandoned.

(51) Int. Cl.[7] ........................ C08G 63/00; C08G 69/44; C08L 77/00; B32B 27/00; C08F 283/04
(52) U.S. Cl. ........................ 528/310; 528/271; 528/272; 528/288; 528/292; 528/301; 528/323; 525/411; 525/419; 525/420; 428/221; 428/357; 428/364; 428/394; 428/395; 428/474.4; 428/480; 442/327; 442/181; 442/324
(58) Field of Search ................................. 528/301, 310, 528/323, 292, 271, 272, 288; 525/419, 420, 411; 442/181, 324, 327; 428/221, 357, 364, 394, 395, 474.4, 480

(56) References Cited

U.S. PATENT DOCUMENTS

| 3,363,027 | A | | 1/1968 | Schnegg et al. |
| 3,660,356 | A | | 5/1972 | Radlmann et al. |
| 4,208,493 | A | * | 6/1980 | Deleens et al. ............. 525/420 |
| 4,230,838 | A | | 10/1980 | Foy et al. |
| 4,252,920 | A | | 2/1981 | Deleens et al. |
| 4,331,786 | A | * | 5/1982 | Foy et al. .................. 525/408 |
| 4,332,920 | A | | 6/1982 | Foy et al. |
| 4,345,064 | A | | 8/1982 | Mumcu |
| 4,349,661 | A | | 9/1982 | Mumcu |
| 4,361,680 | A | | 11/1982 | Borg et al. |
| 4,438,240 | A | * | 3/1984 | Tanaka et al. .............. 525/420 |
| 4,483,975 | A | * | 11/1984 | de Jong et al. ............. 528/288 |
| 4,526,735 | A | | 7/1985 | Norota et al. |
| 4,536,563 | A | | 8/1985 | Okitsu et al. |
| 4,556,688 | A | | 12/1985 | McCready et al. |
| 4,588,785 | A | | 5/1986 | Bax et al. |
| 4,740,582 | A | | 4/1988 | Coquard et al. |
| 5,331,061 | A | | 7/1994 | Liedloff |
| 5,444,120 | A | | 8/1995 | Liedloff |
| 5,489,667 | A | | 2/1996 | Knipf et al. |
| 5,691,412 | A | | 11/1997 | Matsumura et al. |
| 6,300,463 | B1 | | 10/2001 | Figuly et al. |
| 2002/0007043 | A1 | | 1/2002 | Sunkara et al. |
| 2002/0010374 | A1 | | 1/2002 | Sunkara et al. |

OTHER PUBLICATIONS

S. Fakirov, et al., "Multiblock poly(ether–ester–amide)s based on polyamide–6 and poly(ethylene glycol), 1, Effect of polyether segment length on the properties of poly(ether–ester–amide)s with various polyamide/polyether ratios", Makromol. Chem., vol. 193, p. 2391–2404 (1992).

H. Mark, et al., Ed., Encyclopedia of Polymer Science and Engineering, vol. 6, John Wiley & Sons, New York, pp. 733–755 and 802–839 (1986).

Concise Chemical and Technical Dictionary, p. 947 (4th Ed., H. Bennett, Ed., 1986).

International Search Report dated Dec. 31, 2002.

* cited by examiner

Primary Examiner—P. Hampton Hightower
(74) Attorney, Agent, or Firm—Mark D. Kuller

(57) ABSTRACT

Polytrimethylene ether ester amide and use thereof.

36 Claims, No Drawings

POLYTRIMETHYLENE ETHER ESTER AMIDE AND USE THEREOF

CROSS REFERENCE(S) TO RELATED APPLICATION(S)

This is a continuation-in-part of U.S. patent application Ser. No. 10/013,073, filed Dec. 10, 2001 now abandoned, which is incorporated herein by reference.

BACKGROUND OF THE INVENTION

1. Field of the Invention

The field of this invention is polyether ester amides and their use.

2. Description of Related Art

Thermoplastic elastomers (TPE) are a class of polymers which combine the properties of two other classes of polymers, namely thermoplastics which may be reformed upon heating, and elastomers which are rubber-like polymers. One form of TPE is a block polymer, usually containing some blocks whose polymer properties usually resemble those of thermoplastics, and some blocks whose properties usually resemble those of elastomers. Those blocks whose properties resemble thermoplastics are often referred to as "hard" segments, while those blocks whose properties resemble elastomers are often referred to as "soft" segments. In such TPEs, the hard segments are believed to take the place of chemical crosslinks in traditional thermosetting elastomers, while the soft segments provide the rubber-like properties. Improved thermoplastic elastomers, particularly those with improved elastomeric properties such as high tenacity, elongation and unload power, and low tensile set, have been desired for use in fibers and other shaped articles.

Polyether ester amide block polymers prepared from polyether glycol and polyamide with carboxyl end groups are known. These polymers have been prepared using polyethylene glycol, polypropylene glycol, polytetramethylene glycol, copolyethers derived therefrom, and copolymers of THF and 3-alkylTHF as shown by U.S. Pat. Nos. 4,230,838, 4,252,920, 4,349,661, 4,331,786 and 6,300,463, all of which are incorporated herein by reference. The general structure may be represented by the following formula (I):

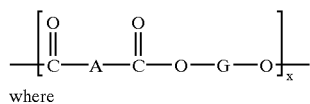

where

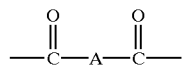
(II)

represents a polyamide segment containing terminal carboxyl groups or acid equivalents thereof (e.g., diacid anhydrides, diacid chlorides or diesters) and

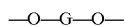
(III)

is a polyether segment.

Poly ether ester amides prepared using poly(ethylene glycol) have the disadvantage that they absorb considerable amounts of moisture. Polypropylene glycol as described in the aforementioned patents refers to the polyether glycol derived from 1,2-propylene oxide. Polymerizations using polypropylene glycol generally proceed slowly due to the presence of sterically-hindered secondary hydroxyl groups. The extended periods of time for which these polymers are held at elevated temperatures can lead to thermal decomposition and discoloration. Polytetramethylene ether ester amide block polymers are easy to prepare, and thus they have been used to prepare fibers with elastomeric properties. Polyether ester amide elastomers derived from copolymers of tetrahydrofuran (THF) and 3-methylTHF are relatively new and have been found to have excellent physical properties, particularly high unload power and elastic recovery (lower tensile set) after stretching.

None of the aforementioned patents describe preparing polyether ester amide elastomers from polytrimethylene ether glycol. It has unexpectedly been found that polytrimethylene ether ester amides provide improved elastomeric properties over polytetramethylene ether ester amide block polymers and polyether ester amide elastomers derived from copolymers of tetrahydrofuran (THF) and 3-methylTHF. Particularly noteworthy are improvements in elongation and tensile set.

SUMMARY OF THE INVENTION

The invention is directed to polytrimethylene ether ester amide and its use.

The polyamide segment preferably has an average molar mass of at least about 300, more preferably at least about 400. Its average molar mass is preferably up to about 5,000, more preferably up to about 4,000 and most preferably up to about 3,000.

The polytrimethylene ether segment has an average molar mass of at least about 800, more preferably at least about 1,000 and more preferably at least about 1,500. Its average molar mass is preferably up to about 5,000, more preferably up to about 4,000 and most preferably up to about 3,500.

The polytrimethylene ether ester amide preferably comprises 1 up to an average of up to about 60 polyalkylene ether ester amide repeat units. Preferably it averages at least about 5, more preferably at least about 6, polyalkylene ether ester amide repeat units. Preferably it averages up to about 30, more preferably up to about 25, polyalkylene ether ester amide repeat units.

At least 40 weight % of the polyalkylene ether repeat units are polytrimethylene ether repeat units. Preferably at least 50 weight %, more preferably at least about 75 weight %, and most preferably about 85 to 100 weight %, of the polyether glycol used to form the soft segment is polytrimethylene ether glycol.

The weight percent of polyamide segment, also sometimes referred to as hard segment, is preferably at least about 10% and most preferably at least about 15% and is preferably up to about 60%, more preferably up to about 40%, and most preferably up to about 30%. The weight percent of polytrimethylene ether segment, also sometimes referred to as soft segment, is preferably up to about 90%, more preferably up to about 85%, and is preferably at least about 40%, more preferably at least about 60% and most preferably at least about 70%.

The polytrimethylene ether ester amide comprises polyamide hard segments joined by ester linkages to polytrimethylene ether soft segments and is prepared by reacting carboxyl terminated polyamide or diacid anhydride, diacid chloride or diester acid equivalents thereof and polyether glycol under conditions such that ester linkages are formed. Preferably it is prepared by reacting carboxyl terminated polyamide and polyether glycol comprising at least 50 weight %, more preferably at least 75 weight %, and most preferably about 85 to 100 weight %, polytrimethylene ether glycol.

In one preferred embodiment the carboxyl terminated polyamide is the polycondensation product of lactam, amino-acid or a combination thereof with dicarboxylic acid. Preferably, the carboxyl terminated polyamide is the polycondensation product of $C_4$–$C_{14}$ lactam with $C_4$–$C_{14}$ dicarboxylic acid. More preferably, the carboxyl terminated polyamide is the polycondensation product of lactam selected from the group consisting of lauryl lactam, caprolactam and undecanolactam, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof. Alternatively, the carboxyl terminated polyamide is the polycondensation product of amino-acid with dicarboxylic acid, preferably $C_4$–$C_{14}$ amino-acid and preferably $C_4$–$C_{14}$ dicarboxylic acid. More preferably, the carboxyl terminated polyamide is the polycondensation product of amino-acid selected from the group consisting of 1-amino-undecanoic acid and 12-aminododecanoic acid, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof.

In another preferred embodiment, the carboxyl terminated polyamide is the condensation product of a dicarboxylic acid and diamine. Preferably, the carboxyl terminated polyamide is the condensation product of a $C_4$–$C_{14}$ alkyl dicarboxylic acid and $C_{4-14}$ diamine. More preferably, the polyamide is selected from the group consisting of nylon 6-6, 6-9, 6-10, 6-12 and 9-6.

Preferably the polytrimethylene ether ester amide has a general structure represented by the following formula (I):

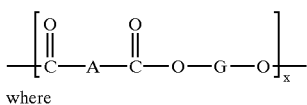

where

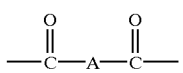
(II)

represents a polyamide segment containing terminal carboxyl groups or acid equivalents thereof, and

(III)

is a polyether segment, and X is 1 up to an average of about 60, and wherein at least 40 weight % of the polyether segments comprise polytrimethylene ether units. (A and G are used to depict portions of the segments which are ascertained from the description of the polytrimethylene ether ester amide and starting materials.)

Preferably the polytrimethylene ether ester amide of claim 1 has the general structure represented by the above formula (I) where (II) represents a polyamide segment containing terminal carboxyl groups or acid equivalents thereof, (III) is a polytrimethylene ether segment, and X is 1 up to an average of about 60.

The invention is also directed to shaped articles comprising the polytrimethylene ether ester amide. Preferred shaped articles include fibers, fabrics and films.

DETAILED DESCRIPTION OF THE INVENTION

The invention is directed to polytrimethylene ether ester amide and its use.

Polytrimethylene ether ester amides can be thought of as comprising polyamide hard segments or blocks joined by ester linkages to polyether soft segments or blocks. Thus, they are sometimes referred to as block polymers. They are prepared by reacting carboxyl terminated polyamide (or acid equivalents thereof) and polyether glycols.

Herein, when referring to the polytrimethylene ether ester amide, carboxyl terminated polyamide or acid equivalents thereof, polytrimethylene ether glycol, etc., it should be understood that reference is to one or more of these items. Thus, for instance, when referring to at least 40 weight % of the polymeric ether glycol used to form the soft segment being polytrimethylene ether glycol, it should be understood that one or more polytrimethylene ether glycols can be used.

The general structure of polytrimethylene ether ester amides can be thought of with reference to formula (I) where (II) represents a carboxyl terminated polyamide (or acid equivalent thereof) segment, and (III) is a polyether segment at least 40 weight % of which is from polytrimethylene ether glycol and is referred to herein as a polytrimethylene ether segment (it may also be referred to as a "poly(trimethylene oxide) segment").

The polyamide segment preferably has an average molar mass of at least about 300, more preferably at least about 400. Its average molar mass is preferably up to about 5,000, more preferably up to about 4,000 and most preferably up to about 3,000.

The polytrimethylene ether segment preferably has an average molar mass of at least about 800, more preferably at least about 1,000 and more preferably at least about 1,500. Its average molar mass is preferably up to about 5,000, more preferably up to about 4,000 and most preferably up to about 3,500.

The polytrimethylene ether ester amide contains at least 1 polyether ester amide repeat unit. It preferably comprises up to an average of up to about 60 polyalkylene ether ester amide repeat units. Preferably it averages at least about 5, more preferably at least about 6, polyalkylene ether ester amide repeat units. Preferably it averages up to about 30, more preferably up to about 25, polyalkylene ether ester amide repeat units.

The weight percent of polyamide segment, also sometimes referred to as hard segment, is preferably at least about 10% and most preferably at least about 15% and is preferably up to about 60%, more preferably up to about 40%, and most preferably up to about 30%. The weight percent of polytrimethylene ether segment, also sometimes referred to as soft segment, is preferably up to about 90%, more preferably up to about 85%, and is preferably at least about 40%, more preferably at least about 60% and most preferably at least about 70%.

Carboxyl terminated polyamides or acid equivalents thereof, such as diacid anhydrides, diacid chlorides or diesters, useful in preparing the polytrimethylene ether ester amides of this invention are well known. They are described in many patents and publications related to the manufacture of other polyalkylene ester amides, such as U.S. Pat. Nos. 4,230,838, 4,252,920, 4,331,786, 4,349,661 and 6,300,463; all of which are incorporated herein by reference.

Preferred polyamides are those having dicarboxylic chain ends and most preferred are linear aliphatic polyamides which are obtained by methods commonly used for preparing such polyamides, such as processes comprising the polycondensation of a lactam, an amino-acid or a diamine with a diacid, such as described in U.S. Pat. No. 4,331,786, which is incorporated herein by reference.

Preferred polyether ester amides are those in which the carboxyl terminated polyamide poly amide was derived from the polycondensation of lactams or amino-acids with a dicarboxylic acid. The dicarboxylic acid functions a chain limiter and the exact ratio of lactam or amino-acid to dicarboxylic acid is chosen to achieve the final desired molar mass of the polyamide hard segment. Preferred lactams contain 4–14 carbon atoms, such as lauryl lactam, caprolactam and undecanolactam. Most preferred is lauryl lactam. Preferred amino acids contain 4–14 carbon atoms and include 11-amino-undecanoic acid and 12-aminododecanoic acid. The dicarboxylic acid can be either linear aliphatic, cycloaliphatic, or aromatic.

The preferred dicarboxylic acids contain 4–14 carbon atoms. Examples include succinic acid, adipic acid, suberic acid, azelaic acid, sebacic acid, undecanedioic acid, dodecanedioic acid, terephthalic acid, and isophthalic acid. Most preferred are the linear aliphatic dicarboxylic acids, especially adipic acid and dodecanedioic acid.

The polyamide can also be a product of the condensation of a dicarboxylic acid and diamine. In this case an excess of the diacid is used to assure the presence of carboxyl ends. The exact ratio of diacid to diamine is chosen to achieve the final desired molar mass of the polyamide hard segment. Linear aliphatic or cycloaliphatic diacids can be used. The preferred dicarboxylic acids contain 4–14 carbon atoms and most preferred are linear aliphatic dicarboxylic acids that contain 4–14 carbon atoms. Examples include succinic acid, adipic acid, suberic acid, azelaic acid, sebacic acid, undecanedioic acid and dodecanedioic acid. Most preferred is dodecanedioic acid. Linear aliphatic diamines containing 4–14 carbon atoms are preferred. Hexamethylenediamine is most preferred. Examples of polyamides derived from the aforementioned diacids and diamines include nylon 6-6, 6-9, 6-10, 6-12 and 9-6 which are products of the condensation of hexamethylene diamine with adipic acid, azelaic acid, sebacic acid, 1,12-dodecanedioic acid, and of nonamethylene diamine with adipic acid, respectively.

The soft segment of the polytrimethylene ether ester amide is prepared from polytrimethylene ether glycol (PO3G). PO3G's useful for this invention are described in U.S. patent application Ser. Nos. 09/738,688 and 09/738,689, both filed Dec. 15, 2000 (now U.S. patent application Nos. 2002/0007043 A1 and 2002/0010374 A1), and their PCT counterparts WO 01/44348 and 01/44150, all of which are incorporated herein by reference.

PO3G can be prepared by any process known in the art. PO3G can be prepared by dehydration of 1,3-propanediol or by ring opening polymerization of oxetane. The process is irrelevant so long as the polyether glycol meets the specifications for the final polymer product. Methods for making PO3G are described in U.S. patent application Ser. Nos. 09/738,688 and 09/738,689, both filed Dec. 15, 2000 (now U.S. patent application Nos. 2002/0007043 A1 and 2002/0010374 A1) and their PCT counterparts WO 01/44348 and 01/44150, all of which are incorporated herein by reference.

Up to 60 weight % of the soft segment may comprise polymeric ether glycol other than PO3G. Preferred are those selected from the group consisting of polyethylene ether glycol (PEG), polypropylene ether glycol (PPG), polytetramethylene ether glycol (PO4G), polyhexamethylene ether glycol, and copolymers of tetrahydrofuran and 3-alkyl tetrahydrofuran (THF/3MeTHF). The other polymeric ether glycols have an average molar mass such that the polytrimethylene ether segment containing them has an average molar mass of at least about 800, more preferably at least about 1,000 and more preferably at least about 1,500. Preferably at least about 50 weight %, more preferably at least about 75 weight %, and most preferably about 85 to 100 weight %, of the polyether glycol used to form the soft segment is PO3G.

Small amounts of other repeat units may also be present in the polytrimethylene ether ester amide. Among these other repeat units may be branching agents, which are tri- or higher functional compounds such as triamines, trihydroxy compounds, or tricarboxylic acids, even though these branching agents may change the rheological properties of the resulting polymer. Trifunctional compounds are preferred as branching agents. Examples of useful branching agents include trimesic acid and tris(2-aminoethyl) amine.

The polytrimethylene ether ester amides may be made by known methods, see for instance U.S. Pat. Nos. 4,230,838, 4,331,786, 4,252,920, 4,208,493, 5,444,120 and 6,300,463, and S. Fakirov, et al., Makromol. Chem., vol. 193, p. 2391–2404 (1992), all of which are incorporated by reference. They are preferably prepared by reacting the carboxyl terminated polyamide with the polyalkylene glycol at reduced pressures and temperatures between 200 and 280° C., and in the presence of a catalyst. Pressure is typically in the range of about 0.01 to about 18 mm Hg (1.3 to 2400 Pa), preferably in the range of about 0.05 to about 4 mm Hg (6.7 to 533 Pa) and most preferably about 0.05 to about 2 mm Hg (6.7 to 267 Pa). Examples of suitable catalysts include tin catalysts such as butylstannoic acid, titanium catalysts such as tetraalkylorthotitanate (e.g., tetrabutyl or tetraisopropyl titanate), or zirconate catalysts such as tetrabutylzirconate. Tetrabutylzirconate is preferred.

Polytrimethylene ether ester amides are useful wherever thermoplastic elastomers are used. They are particularly useful in making fibers, fabrics, films and other shaped articles, such as molding resins for automotive and electrical uses (including glass and other fiber reinforced molding resins). The fibers are stretchy and have excellent physical properties, including superior strength, elongation and stretch recovery properties, particularly improved unload power. Typically they have much higher enlongation and much better elastic recovery (lower tensile set) after stretching than similar polymers based on other polyether glycols, especially when recovering from higher elongations such as 200% or more. These polymers also exhibit a high level of elongation while maintaining a high level of tenacity. This is particularly important when used as the elastic fibers in fabrics such as undergarments and bathing suits.

The fibers can include monocomponent and multicomponent fiber (containing the polyether ester amide as at least one component) such as bicomponent and biconstituent fibers (for example, as described in U.S. patent application Ser. No. 09/966,145, filed Sep. 28, 2001 and U.S. patent application Ser. No. 09/966,037, filed Sep. 28, 2001), which are incorporated herein by reference, and can be continuous filaments or staple fiber. The fibers are used to prepare woven, knit and nonwoven fabric. The nonwoven fabrics can be prepared using conventional techniques such as use for meltblown, spunbonded and card and bond fabrics, including heat bonding (hot air and point bonding), air entanglement, etc.

Fibers and fabrics may be made by standard methods such as described in H. Mark, et al., Ed., Encyclopedia of Polymer Science and Engineering, Vol. 6, John Wiley & Sons, New York, 1986, pages 733–755 and 802–839, and U.S. Pat. Nos. 4,331,786, 5,489,667 and 6,300,463, all of which are incorporated herein by reference or by other well known methods.

The fibers are preferably at least about 10 denier (11 dtex), and preferably are up to about 2,000 denier (2,200 dtex), more preferably up to about 1,200 denier (1,320 dtex), and most preferably up to about 120 denier (132 dtex).

Spinning speeds can be at least about 200 meters/minute (m/min), more preferably at least about 400 m/min, and ever more preferably at least about 500 m/min, and can be up to about 2,000 or about 3,000 m/min or higher.

In most cases it is preferred not to draw the fibers. However, the fibers can be drawn and when drawn draw ratios preferably range from about 1.5× to about 6×, more preferably at least about 1.5× and more preferably up to about 4×. Single step draw is the preferred drawing technique.

Finishes can be applied for spinning or subsequent processing, and include silicon oil, mineral oil, and other spin finishes used for polyether ester amide elastomers.

Conventional additives can be incorporated into the polytrimethylene ether ester amides, polytrimethylene ether glycol, polyamide or fiber by known techniques. The additives include delusterants (e.g., $TiO_2$, zinc sulfide or zinc oxide), colorants (e.g., dyes), stabilizers (e.g., antioxidants, ultraviolet light stabilizers, heat stabilizers, etc.), fillers, flame retardants, pigments, antimicrobial agents, antistatic agents, optical brightners, extenders, processing aids, viscosity boosters, and other functional additives.

EXAMPLES

The invention is illustrated in the following examples which are not intended to be limiting. Therein, all percentages, parts, etc., are by weight unless otherwise indicated.

Number Average Molecular Weight (Mn)

The number average molecular weights (Mn) of polytrimethylene ether glycols were determined either by analyzing hydroxyl end-groups using NMR spectroscopic method or by titration. Hydroxyl number was determined according to ASTM E222 method and is the way that should be used to analyze whether something is within the scope of this invention.

Polymer Melting Temperature and Melting Enthalpy

Polymer melting temperature, Tm, was measured with a DuPont Model 910 Differential Scanning Calorimeter, and is defined as the temperature at the lowest point of the endotherm of transition to an isotropic melt observed on the second heating cycle, using a heating rate of 10° C./min. H.S. ΔH (J/g) is melting enthalpy of the hard segment domains.

Hard Segment Weight Percentage Calculation

The weight percent hard segment, % HS, was calculated according to the following formula:

$$\% \ HS = \frac{100(w_{HS})((M_{HS} - 34)/M_{HS})}{(w_{HS})((M_{HS} - 34)/M_{HS}) + (w_{SS})((M_{SS} - 2)/M_{SS})}$$

where:
- $w_{HS}$ is the initial weight of the hard segment in grams
- $M_{HS}$ is molecular weight of the hard segment in atomic mass units ("amu") (grams/mole)
- $w_{SS}$ is the initial weight of the soft segment in grams
- $M_{SS}$ is molecular weight of the soft segment in amu Inherent Viscosity Inherent Viscosity, IV, measurements were made following ASTM Method 2857-70 and IV is reported in dl/g. The polymer samples were dried at 70° C. for 3 hours before weighing. Samples were run at 30° C. using a 0.5% solution in m-cresol. To improve efficiency, accuracy, and precision an AutoVisc® Automatic Measuring System (Design Scientific, Gainesville, Ga., U.S.A., now believed to be manufactured by Cannon Instruments, State College, Pa., U.S.A. under the name AutoVisc® I) automated viscosity measuring system was used. A high density infrared fiber optic detection system was used in place of a human operator and an air bath was used in place of the oil or water bath normally used to provide constant temperature. The AutoVisc exceeds the accuracy specifications of ASTM D-445, "Standard Test Method For Kinematic Viscosity of Transparent and Opaque Liquids".

Fiber Spinning Procedure

To perform the melt spinning, a cylindrical cell of 2.2 cm (⅞ inch) inside diameter and 12.7 cm (5 inch) length was employed. The cell was equipped with a hydraulically driven ram that was inserted on top of the sample. The ram had a replaceable Teflon® tip designed to fit snugly inside the cell. An annular electric heater which surrounded the lower quarter of the cell was used for controlling cell temperature. A thermocouple inside the cell heater recorded the cell temperature. Attached to the bottom of the cell was a spinneret, the interior of which included a cylindrical passage, measuring 1.27 cm (0.5 inch) in diameter and 0.64 cm (0.25 inch) in length, which was connected to the bottom of the cell cavity. The spinneret cavity contained stainless steel filters of the following mesh, inserted in the following order, starting from the bottom (i.e., closest to the exit): 50, 50, 325, 50, 200, 50,100, 50. A compressible annular aluminum seal was fitted to the top of the "stack" of filters. Below the filters was a cylindrical passage of about 2.5 cm (1 inch) length and 0.16 cm (¹⁄₁₆ inch) interior diameter, the lower of which was tapered (at an angle of 60 degrees from the vertical) to meet with an outlet orifice measuring 0.069 cm (0.027 inch) in length and 0.023 cm (0.009 inch) in inside diameter. The spinneret temperature was controlled by a separate annular heater. After exiting the spinneret, the fiber was wrapped several times around two feed rolls operating at a speed of a rpm, and then several times around two draw rolls operating at a speed of b rpm, after which they are collected on a bobbin 6 inches in diameter spinning at a speed of c rpm. The ratio of b/a is referred to as the "draw ratio". The examples below were prepared using a draw ratio of 4.

Fiber Tenacity and Elongation

Tenacity at break, T, in grams per denier (gpd) and percent elongation at break, E, were measured on an Instron® Tester equipped with a Series 2712 (002) Pneumatic Action Grips equipped with acrylic contact faces. The test was repeated three times and then the average of the results is reported.

Fiber Unload Power and Percent Set

"Unload power" was measured in $dN/tex_{eff}$. One filament, a 2-inch (2.5 cm) gauge length, was used for each determination. Separate measurements were made using zero-to-100% and/or zero-to-200% elongation cycles and/or zero-to-300% elongation cycles. Unload power (i.e., the stress at a particular elongation) was measured after the samples have been cycled five times at a constant elongation rate of 1000% per minute and then held at 100, 200 or 300% extension for half a minute after the fifth extension. While unloading from this last extension, the stress, or unload power, was measured at various elongations. Unload powers are reported herein using the general form 'UP x/y' where x is the percent elongation to which the fiber was cycled five times and y is the percent elongation at which the stress, or unload power, was measured.

The percent set was measured from the stress/strain curve recorded on chart paper.

Example 1

A hard segment was prepared in a standard three-neck flask. One joint was fitted with a take-off arm leading to a cold trap to condense volatile reaction by-products. The cold trap in turn was connected to a manifold capable of delivering an inert gas such as argon or nitrogen or providing a vacuum. The reaction was stirred using a mechanical agitator fitted with a stainless steel paddle stirrer and was interfaced with a Cole-Parmer Servodyne® Controller 4445-30 torquemeter with a 1:1 gear ratio.

The three-neck flask was charged with 20.0 g (136 mmol) adipic acid and 91.8 g (465 mmol) lauryl lactam. A nitrogen atmosphere was introduced by repeated (3×) vacuum evacuation and nitrogen backfill. The reaction was heated at 220° C. for one hour followed by 2 hours at 245° C. The reaction was allowed to cool to room temperature under a nitrogen atmosphere.

After cooling to room temperature under a nitrogen atmosphere, the reaction product was isolated as a colorless solid. The material could be easily broken into small pieces for weighing and use in subsequent elastomer preparation examples. The isolated yield of the polyamide hard segments was 94%.

PO3G having a number average molecular weight of 2360 was prepared using the procedures described in Example 4 of pending U.S. patent application Ser. No. 09/738,688, filed Dec. 15, 2000 (now U.S. patent application No. 2002/0007043 A1, corresponding to WO 01/44348), which is incorporated herein by reference.

To prepare the polyether-ester-amide elastomer, a resin kettle was charged with 15.0 g (18.4 mmol) of the hard segment described above, 43.1 g (18.3 mmol) of 2360 Mn PO3G, 0.40 g Ethanox® 330 antioxidant, and 0.117 g (0.2 wt. %) butylstannoic acid catalyst. The flask was evacuated and backfilled with $N_2$ gas three times to create an inert atmosphere. The reaction was heated for one hour at 210° C. and then one hour at 235° C. under $N_2$. At that point, the temperature was raised to 245° C. and then vacuum was introduced. The pressure was lowered from atmospheric to 0.01–0.1 mm Hg (1.3–13 Pa) over 90 minutes. The reaction was continued under vacuum at 245° C. until the torquemeter read 90 D.C. millivolts at 90 rpm. The flask was backfilled with $N_2$ and the polymer was removed while still hot. The isolated yield was 88%. Materials are provided in Table 1. Properties are provided in Table 2.

Example 2

Example 1 was repeated and UP 200/100 and % Set 200 were measured.

Comparative Example A

The hard segment was prepared according to Example 1. A three neck flask was charged with 1 1-aminoundecanoic acid and adipic acid in a mole ratio of aminoacid to diacid of 3.8:1. A nitrogen atmosphere was introduced by repeated (3×) vacuum evacuation and nitrogen backfill. The reaction was heated at 245–250° C. for three hours and allowed to cool to room temperature under a nitrogen atmosphere. Alternately the reaction can be run at 210° C. for the first hour to avoid bumping, followed by two hours at 240–250° C.

After cooling to room temperature under a nitrogen atmosphere, the hard segment was isolated as a colorless solid. The material could be easily broken into small pieces for weighing and use in subsequent elastomer preparation examples. The isolated yield of the hard segment was 89%. Tm onset was 135° C. and ΔH was 62.2 J/g.

To prepare the polyether-ester-amide elastomer the process was also similar to Example 1. A resin kettle was charged with 30 g (33.5 mmol) of the hard segment polyamide prepared from 11-aminoundecanoic acid and adipic acid, 77.2 g (33.9 mmol) of a copolyether soft segment of tetrahydrofuran and 3-methyltetrahydrofuran (THF/3MeTHF), with Mn=2276 g/mol and 14% of repeat units containing methyl side groups, 0.40 g Ethanox® 330 antioxidant, and 0.215 g (0.2 wt %) butyl stannoic acid catalyst. The flask was evacuated and backfilled with $N_2$ gas three times to create an inert atmosphere. The reaction was heated for one hour at 210° C. and then 90 min at 235° C. under $N_2$. At that point vacuum was introduced, and the pressure was lowered from atmospheric to 0.01 to 0.08 mm Hg (1.3–10.6 Pa) over 90 minutes. The reaction was continued under vacuum at 235–240° C. until the torquemeter until the torquemeter read 90 D.C. millivolts at 90 rpm. The flask was backfilled with $N_2$ and the polymer was removed while still hot. The isolated yield was 86%. Materials are provided in Table 1. Properties are provided in Table 2.

Comparative Example B

The hard segment was prepared as described in Comparative Example A. The polyether-ester-amide elastomer was prepared as described in Comparative Example A using poly(tetramethylene ether) glycol (PTMEG) as the soft segment.

TABLE 1

| | Hard Segment | | Soft Segment | | | |
|---|---|---|---|---|---|---|
| Ex. No. | Lactam/ Amino Acid | Diacid | Polyether | Mn | % Methyl | % HS |
| 1 | Lauryl lactam | Adipic Acid | Polytrimethylene ether glycol | 2360 | 0 | 25.0 |
| 2 | Lauryl lactam | Adipic Acid | Polytrimethylene ether glycol | 2360 | 0 | 25.0 |
| A | 11-amino-undecanoic acid | Adipic Acid | THF/3 MeTHF copolyether | 2276 | 14 | 27.2 |
| B | 11-amino-undecanoic acid | Adipic Acid | Polytetra-methylene ether glycol | 2000 | 0 | 29.8 |

TABLE 2

| Ex | IV Dl/g | H.S Tm (° C., onset) | H.S. ΔH (J/g) | T gpd | E (%) | Toughness (gpd) | UP 100 50 | % Set 100 | UP 200 100 | % Set 200 | UP 300 200 | % Set 300 |
|---|---|---|---|---|---|---|---|---|---|---|---|---|
| 1 | 1.68 | 109.2 | 11.6 | 1.02 | 460 | 1.77 | — | — | — | — | 108 | 38 |
| 2 | 1.68 | 109.2 | 11.6 | 0.87 | 541 | 1.70 | — | — | 47.7 | 14.4 | 99 | 37 |

TABLE 2-continued

| Ex | IV Dl/g | H.S Tm (° C., onset) | H.S. ΔH (J/g) | T gpd | E (%) | Toughness (gpd) | UP 100 50 | % Set 100 | UP 200 100 | % Set 200 | UP 300 200 | % Set 300 |
|---|---|---|---|---|---|---|---|---|---|---|---|---|
| A | 1.55 | 132.5 | 8.9 | 0.79 | 325 | 1.23 | 52.4 | 7.0 | 46.1 | 30.0 | — | — |
| B | 1.55 | 121.1 | 16.4 | 1.88 | 212 | 1.85 | 44.4 | 23.7 | 4.8 | 111.0 | — | — |

The fibers of the invention had higher elongation than the elastomers of the comparative examples, while maintaining high tenacity. In addition, they had excellent stretch-recovery properties including a high unload power and low set.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. Polytrimethylene ether ester amide.
2. The polytrimethylene ether ester amide of claim 1 comprising a polyamide hard segment having an average molar mass of 300–5,000 and polytrimethylene ether soft segment having an average molar mass of 800 to 5,000.
3. The polytrimethylene ether ester amide of claim 1 comprising a polyamide hard segment having an average molar mass of 400–3,000 and polytrimethylene ether soft segment having an average molar mass of 1,500 to 3,500.
4. The polytrimethylene ether ester amide of claim 1 which comprises 1 up to an average of about 60 polyalkylene ether ester amide repeat units.
5. The polytrimethylene ether ester amide of claim 1 wherein at least 50 weight % of the polyalkylene ether ester amide repeat units are polytrimethylene ether ester amide repeat units.
6. The polytrimethylene ether ester amide of claim 2 which comprises 1 up to an average of about 60 polyalkylene ether ester amide repeat units, wherein at least 50 weight % of the polyalkylene ether ester amide repeat units are polytrimethylene ether ester amide repeat units.
7. The polytrimethylene ether ester amide of claim 1 which comprises an average of about 5 to about 30 polyalkylene ether ester amide repeat units.
8. The polytrimethylene ether ester amide of claim 1 comprising about 10 to about 60 weight percent of polyamide hard segment and about 40 to about 90 weight % of polytrimethylene ether soft segment.
9. The polytrimethylene ether ester amide of claim 6 comprising about 10 to about 60 weight percent of polyamide hard segment and about 40 to about 90 weight % of polytrimethylene ether soft segment.
10. The polytrimethylene ether ester amide of claim 1 comprising about 15 to about 30 weight percent of polyamide hard segment and about 70 to about 85 weight % of polytrimethylene ether soft segment.
11. The polytrimethylene ether ester amide of claim 1 comprising polyamide hard segments joined by ester linkages to polytrimethylene ether soft segments prepared by reacting carboxyl terminated polyamide or diacid anhydride, diacid chloride or diester acid equivalents thereof and polyether glycol under conditions such that ester linkages are formed.
12. The polytrimethylene ether ester amide of claim 1 comprising polyamide hard segments joined by ester linkages to polytrimethylene ether soft segments prepared by reacting carboxyl terminated polyamide and polyether glycol comprising at least 50 weight % polytrimethylene ether glycol under conditions such that ester linkages are formed.
13. The polytrimethylene ether ester amide of claim 1 comprising polyamide hard segments joined by ester linkages to polytrimethylene ether soft segments prepared by reacting carboxyl terminated polyamide and polyether glycol comprising at least 75 weight polytrimethylene ether glycol under conditions such that ester linkages are formed.
14. The polytrimethylene ether ester amide of claim 9 comprising polyamide hard segments joined by ester linkages to polytrimethylene ether soft segments prepared by reacting carboxyl terminated polyamide and polytrimethylene ether glycol under conditions such that ester linkages are formed.
15. The polytrimethylene ether ester amide of claim 14 wherein the carboxyl terminated polyamide is the polycondensation product of lactam, amino-acid or a combination thereof with dicarboxylic acid.
16. The polytrimethylene ether ester amide of claim 14 wherein the carboxyl terminated polyamide is the polycondensation product of $C_4$–$C_{14}$ lactam with $C_4$–$C_{14}$ dicarboxylic acid.
17. The polytrimethylene ether ester amide of claim 14 wherein the carboxyl terminated polyamide is the polycondensation product of lactam selected from the group consisting of lauryl lactam, caprolactam and undecanolactam, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof.
18. The polytrimethylene ether ester amide of claim 14 wherein the carboxyl terminated polyamide is the polycondensation product of $C_4$–$C_{14}$ amino-acid with $C_4$–$C_{14}$ dicarboxylic acid.
19. The polytrimethylene ether ester amide of claim 14 wherein the carboxyl terminated polyamide is the polycondensation product of amino-acid selected from the group consisting of 11-amino-undecanoic acid and 12-aminododecanoic acid, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof.
20. The polytrimethylene ether ester amide of claim 14 wherein the carboxyl terminated polyamide is the condensation product of a dicarboxylic acid and diamine.
21. The polytrimethylene ether ester amide of claim 14 wherein the carboxyl terminated polyamide is the condensation product of a $C_{4-C14}$ alkyl dicarboxylic acid and $C_{4-14}$ diamine.
22. The polytrimethylene ether ester amide of claim 20 wherein the polyamide is selected from the group consisting of nylon 6-6, 6-9, 6-10, 6-12 and 9-6.

23. The polytrimethylene ether ester amide of claim 1 having the general structure represented by the following formula (I):

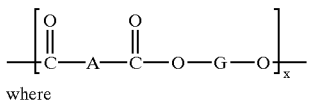

where

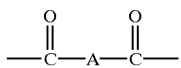 (II)

represents a polyamide segment containing terminal carboxyl groups or acid equivalents thereof, and

—O—G—O— (III)

is a polyether segment, and X is 1 up to an average of about 60, and wherein at least 40 weight % of the polyether segments comprise polytrimethylene ether units.

24. The polytrimethylene ether ester amide of claim 1 having the general structure represented by the following formula (I):

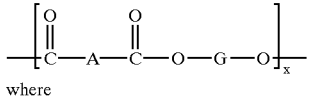

where

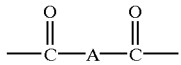 (II)

represents a polyamide segment containing terminal carboxyl groups or acid equivalents thereof, and

—O—G—O— (III)

is a polytrimethylene ether segment, and X is 1 up to an average of about 60.

25. A shaped article comprising the polytrimethylene ether ester amide of claim 1.

26. The shaped article of claim 25 which is a fiber.
27. The shaped article of claim 25 which is a fabric.
28. The shaped article of claim 25 which is a film.
29. A fiber formed from a polytrimethylene ether ester amide.
30. The fiber of claim 29, wherein said polytrimethylene ether ester amide comprises a polyamide hard segment having an average molar mass of 300–5,000 and a polytrimethylene ether soft segment having an average molar mass of 800 to 5,000.
31. The fiber of claim 29, wherein said polytrimethylene ether ester amide comprises a polyamide hard segment having an average molar mass of 400–3,000 and a polytrimethylene ether soft segment having an average molar mass of 1,500 to 3,500.
32. The fiber of claim 29 wherein said polytrimethylene ether ester amide comprises polyalkylene ether ester amide repeat units, said polyalkylene ether ester amide repeat units comprising at least about 50% polytrimethylene ether ester repeat units.
33. The fiber of claim 29 wherein said polytrimethylene ether ester amide comprises from 1 to an average of about 60 polyalkylene ether ester amide repeat units, said polyalkylene ether ester amide repeat units comprising at least about 50% polytrimethylene ether ester repeat units.
34. The fiber of claim 29 wherein said polytrimethylene ether ester amide comprises about 10 to about 60 weight percent polyamide hard segment and about 40 to about 90 weight percent polytrimethylene ether soft segment.
35. The fiber of claim 29 wherein said polytrimethylene ether ester amide comprises about 15 to about 30 weight percent polyamide hard segment and about 70 to about 85 weight percent polytrimethylene ether soft segment.
36. The fiber of claim 29 wherein said polytrimethylene ether ester amide comprises polyamide hard segments joined by ester linkages to polytrimethylene ether soft segments prepared by reacting a carboxyl terminated polyamide and a polyether glycol comprising at least about 50 weight percent polytrimethylene ether glycol.

* * * * *